(12) United States Patent
Drage

(10) Patent No.: US 6,562,449 B2
(45) Date of Patent: May 13, 2003

(54) NANOPOROUS LOW DIELECTRIC CONSTANT POLYMERS WITH HOLLOW POLYMER PARTICLES

(76) Inventor: Jim Drage, P.O. Box 2245, 101 Columbia Rd., Morristown, NJ (US) 07962

( * ) Notice: Subject to any disclaimer, the term of this patent is extended or adjusted under 35 U.S.C. 154(b) by 0 days.

(21) Appl. No.: 09/792,606

(22) Filed: Feb. 22, 2001

(65) Prior Publication Data

US 2002/0115735 A1 Aug. 22, 2002

(51) Int. Cl.$^7$ ................................................. B32B 9/00
(52) U.S. Cl. .......................... 428/318.4; 428/304.4; 428/313.3; 428/314.2; 428/318.6; 428/319.3; 521/61; 521/62; 521/63; 521/134
(58) Field of Search .......................... 521/61, 62, 63, 521/64, 76, 77, 134; 428/304.4, 313.3, 314.2, 318.4, 318.6, 319.3; 525/50, 450

(56) References Cited

U.S. PATENT DOCUMENTS

| | | | | |
|---|---|---|---|---|
| 5,194,459 | A | * | 3/1993 | Sato et al. ................ 428/313.3 |
| 5,955,143 | A | * | 9/1999 | Wheatley et al. ........... 424/489 |
| 6,214,746 | B1 | * | 4/2001 | Leung et al. ............... 438/780 |
| 6,313,185 | B1 | * | 11/2001 | Lau et al. ................... 521/134 |

* cited by examiner

Primary Examiner—James J. Seidleck
Assistant Examiner—Travis B. Ribar
(74) Attorney, Agent, or Firm—Rutan & Tucker, LLP; Sandra P. Thompson; Robert D. Fish

(57) ABSTRACT

A nanoporous polymer comprises hollow structures fabricated from crosslinked polymeric strands. The hollow structures are further coupled to other crosslinked polymeric strands by a covalent bond. Particularly contemplated nanoporous polymers have a Tg of no less than 400° C. and a dielectric constant k of no more than 2.5.

20 Claims, 3 Drawing Sheets

NANOPOROUS LOW DIELECTRIC CONSTANT POLYMERS WITH HOLLOW POLYMER PARTICLES

FIELD OF THE INVENTION

The field of the invention is nanoporous polymers.

BACKGROUND OF THE INVENTION

Decreasing size and increasing density of functional elements in integrated circuits has generated a continuous demand for insulating materials with reduced dielectric constants. Among other approaches, inclusion of air into an insulating material has been successfully used to reduce the dielectric constant of the material, and various methods of introducing air into materials are known in the art.

In one method, a thermolabile component is incorporated into a polymeric material, and after curing the polymeric material, the thermolabile component is destroyed by heating. For example, Hedrick et al. describe in U.S. Pat. No. 5,776,990 blending of a thermostable polymer with a thermolabile (thermally decomposable) polymer. The blended mixture is subsequently crosslinked and the thermolabile portion thermolyzed. Blending a thermostable and a thermolabile polymer is conceptually simple, and allows relatively good control over the amount of porosity in the final polymer. However, positional control of the voids is generally difficult to achieve, and additional problems may arise where control over homogeneity and size of the voids is desirable.

In order to circumvent at least some of the problems associated with void size and distribution, the thermolabile portion can be grafted onto the polymeric strands. For example, block copolymers may be synthesized with alternating thermolabile blocks and thermostable blocks. The block copolymer is then heated to thermolyze the thermolabile blocks. Alternatively, thermostable blocks and thermostable blocks carrying thermolabile portions can be mixed and polymerized to yield a copolymer. The copolymer is subsequently heated to thermolyze the thermolabile blocks. While incorporation of a thermolabile portion generally improves control over pore size and distribution, the synthesis of such polymers is frequently challenging.

Regardless of the approach used to introduce the voids via thermolabile portions in a polymer mixture, structural problems are frequently encountered in fabricating nanoporous materials. Among other things, the porous polymer tends to collapse at the temperature at which the thermolabile component is thermolyzed. Moreover, since the voids are not formed by a mechanically stable structure, the porous polymers tend to collapse when the overall porosity exceeds a critical extent of about 30%.

In another method, structurally more stable void carriers are incorporated into the polymeric material. For example, Yokouchi et al. teach in U.S. Pat. No. 5,593,526 a process for producing a wiring board in which hollow or porous glass spheres are covered with a ceramic coating layer, and wherein the coated glass spheres are then mixed with a glass matrix. Yokouchi's glass spheres help to reduce the dielectric constant of the wiring board, however, require coating by relatively cumbersome and expensive methods such as chemical vapor deposition, etc. Moreover, in order to create a stable structure between the glass matrix and the coated spheres, the mixture has to be baked at temperatures of about 1000° C., which is unacceptable for most, if not all integrated circuits.

Alternatively, Sato et al. describe in U.S. Pat. No. 5,194,459 an insulating material that is formed from a network of hollow gas filled microspheres entrapped in a cured crosslinked fluorinated polymer network. Sato's materials dramatically reduce the temperature requirements as compared to Yokouchi's materials. Furthermore, Sato's materials can be coated onto appropriate materials in a relatively thin layer while retaining tensile strength. However, all of Sato's polymers include fluorine, which tends to reduce adhesion of the polymer to the materials employed in the fabrication of integrated circuits. Moreover, fluorine is known to cause corrosion of metal conductor lines. Still further, since the glass spheres in Sato's polymer network are not covalently bound to the surrounding network, the mechanical integrity of the porous polymer composition may be less than desirable under certain conditions.

Although there are many methods of introducing air in a nanoporous material known in the art, all or almost all of them suffer from one or more disadvantages. Therefore, there is still a need to provide improved methods and compositions for nanoporous low dielectric constant materials.

SUMMARY OF THE INVENTION

The present invention is directed to methods and compositions for nanoporous polymers in which a set of first polymeric strands are crosslinked with each other to form a hollow structure, and in which a set of second polymeric strands are crosslinked with each other and coupled to the first set of polymeric strands via a covalent bond to form a nanoporous polymer.

In one aspect of the inventive subject matter, at least some of the first polymeric strands comprise an aromatic portion, and are preferably a a poly(arylene) and/or a poly(arylene ether). Particularly contemplated poly(arylene ethers) further comprise a triple bond and/or a diene. While the hollow structure may have various shapes, it is preferred that the hollow structure has a spherical shape that is no more than 10 nanometers, and more preferable no more than 3 nanometers in the largest dimension.

In another aspect of the inventive subject matter, the first polymeric strands are crosslinked with each other via a cyclic structure, and in a further preferred aspect, the first polymeric strand and the second polymeric strand are coupled together via a cyclic structure. Although not limiting to the inventive subject matter, it is preferred that the first and second strand belong to the same chemical class. In particularly contemplated nanoporous polymers, the first polymeric strand has a triple bond and the second polymeric strand has a diene, and the first and second polymeric strands are coupled to each other by reacting the triple bond with the diene.

In a further aspect of the inventive subject matter, the nanoporous polymer has a dielectric constant k, and it is generally contemplated that the nanoporous polymers have a dielectric constant k of no more than 2.5, and preferably no more than 2.1. With respect to the glass transition temperature Tg of contemplated nanoporous polymers, preferred polymers have a Tg of no less than 400° C.

Various objects, features, aspects and advantages of the present invention will become more apparent from the following detailed description of preferred embodiments of the invention, along with the accompanying drawing.

DETAILED DESCRIPTION

As used herein, the term "polymeric strand" refers to any composition of monomers covalently bound to define a backbone, which may or may not include additional pendent functional groups or structural moieties. The term "monomer" as used herein refers to any chemical compound that is capable of forming a covalent bond with itself or a chemically different compound in a repetitive manner. Among other things, contemplated monomers may also include block polymers. The repetitive bond formation between monomers may lead to a linear, branched, super-branched or three-dimensional product. As also used herein, the term "backbone" refers to a contiguous chain of atoms or moieties forming a polymeric strand that are covalently bound such that removal of any of the atoms or moiety would result in interruption of the chain.

As also used herein, the term "hollow structure" refers to a configuration formed from a plurality of building blocks each having at least 6 atoms, in which at least some of the building blocks are arranged to define a cavity. For example, a polymeric coat made from a plurality of polyethylene polymeric strands surrounding a glass microsphere is considered a hollow structure under the scope of this definition because the coat is made from building blocks having more than six atoms, and the building blocks are arranged to define a cavity.

As further used herein, the term "crosslinked" refers to an at least temporary physical connection between at least two polymeric strands, and particularly includes a covalent bond between the polymeric strands. The covalent bond may be formed between reactive pending groups in the respective polymeric strands, or may be formed between reactive groups located within the backbone of the respective polymeric strands.

Figure 1:
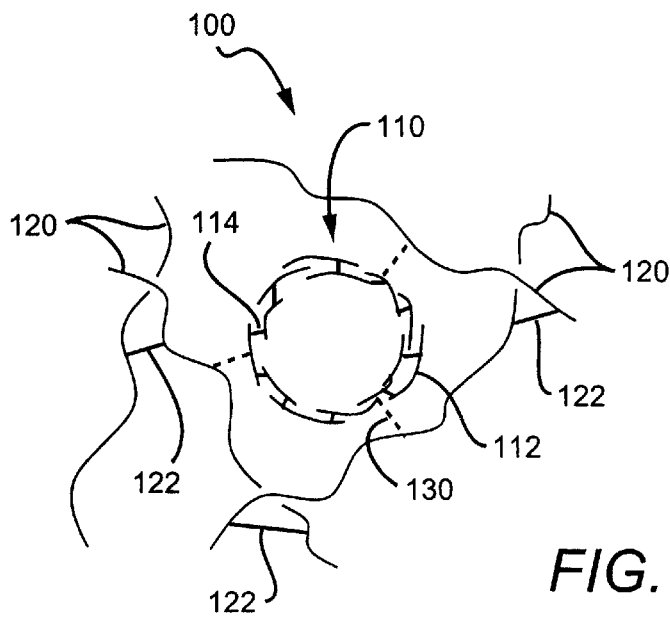
FIG. 1 is a schematic view of an exemplary nanoporous polymer.

In FIG. 1, an exemplary nanoporous polymer 100 generally comprises a hollow structure 110 that is formed from a plurality of first polymeric strands 112, which are crosslinked via crosslinks 114. The hollow structure 110 is covalently coupled to a plurality of second polymeric strands 120 via covalent bonds 130. The second polymeric strands are crosslinked via crosslinks 122.

Figure 2:
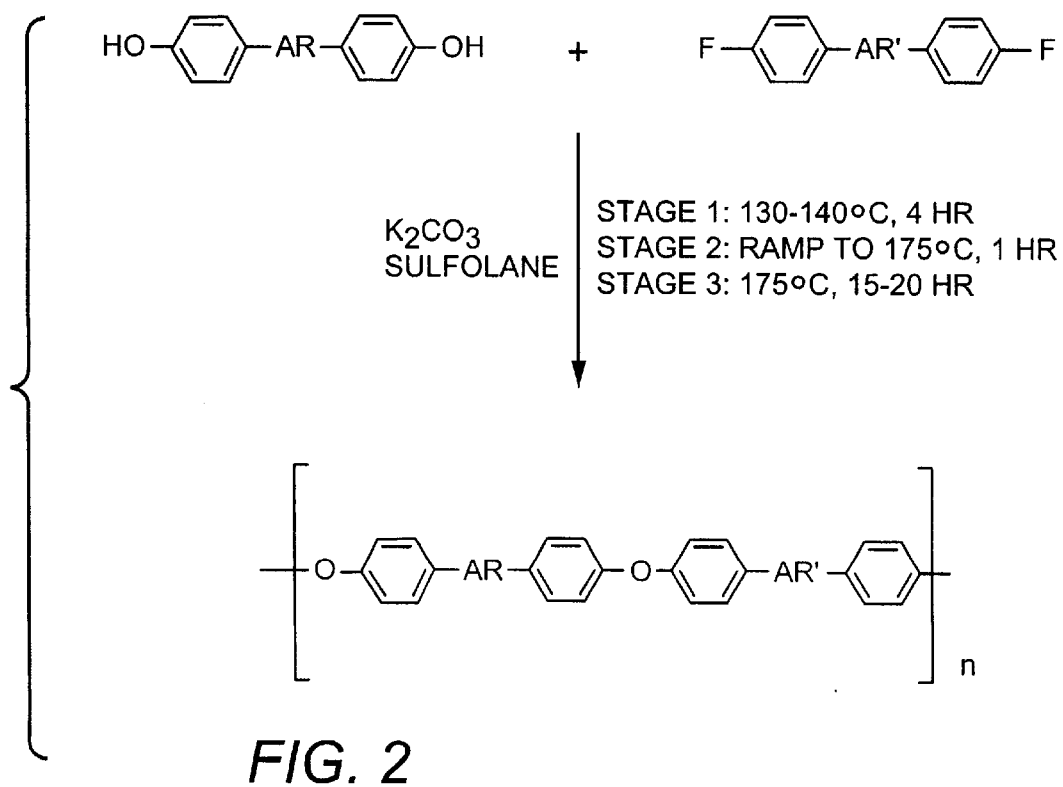
FIG. 2 is a structure of an exemplary polymer and its synthesis.
Figure 3A:
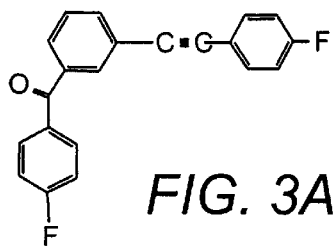
FIGS. 3A–3D are exemplary structures of monomers for a first polymeric strand including a triple bond.
Figure 3B:
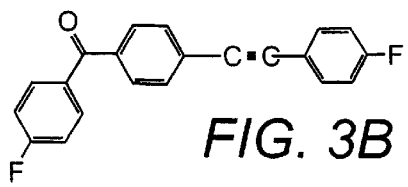
Figure 3C:
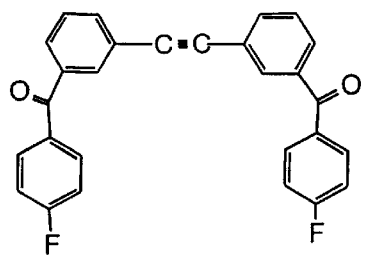
Figure 3D:
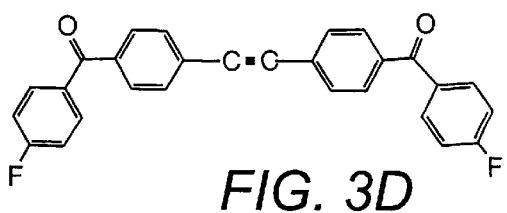

With respect to the first polymeric strands, it is contemplated that the particular chemical nature of the first polymeric strand is not limiting to the inventive concept presented herein, and appropriate polymeric strands may belong to various chemical classes, including polyimides, polyesters, or polyethers. Especially preferred polymeric strands include poly(arylenes) and poly(arylene ethers), and a synthesis and exemplary structure of a preferred poly(arylene ether) is depicted in FIG. 2, wherein AR and AR' independently comprise any suitable thermally stable portion, preferably with a pre-ponderance of aromatic or fused aromatic portions. For example, HO—$C_6H_4$—AR—$C_6H_4$—OH may be fluorene bisphenol, and F—$C_6H_4$—AR'—$C_6H_4$—F may be a difluoroaromatic compound containing at least one tolane moiety. The difluoro-compound and the bisphenolic compound are advantageously reacted in stoichiometric quantities to avoid excess unreacted monomers in the reaction mixture. In the particular example of FIG. 2, the stoichiometric quantities correspond to an equimolar mixture of the difluoro-compound and the bisphenolic compound.

It is generally contemplated that structural moieties and functional groups may be introduced into the polymeric strand by employing suitable monomers that include the desired moieties and/or groups. For example, where it is desirable that the backbone of the polymeric strand includes a dienophile or a diene, monomers as shown in FIGS. 3A–3D (with a triple bond as dienophile) and FIGS. 4A–4B (with a cyclopentadienone as diene) may be employed. Particularly contemplated monomers comprise at least two different reactive groups, and examples for such preferred monomers are depicted in FIGS. 5A–5B.

However, contemplated functional groups need not be restricted to a diene or a dienophile, but may include polar, charged, or hydrophobic groups. For example, where chemical reactivity is particularly desirable, the functional group may be a acid, acid chloride, activated ester, or a base. On the other hand, where electrostatic interactions are preferred, quarternary ammonium groups or polyphosphates may be included. Similarly, where a particular hydrophobicity or hydrophilicty is required (e.g., to achieve solubility in a particular solvent), octyl, cetyl, or polyethylene groups may be included into the polymeric strand.

With respect to structural moieties in the polymeric strand, it is particularly contemplated that appropriate structural moieties may improve physicochemical properties of the nanoporous polymer, and especially contemplated structural moieties include bulky groups to reduce the overall density of the polymeric strands, or thermolabile groups that can be thermally destroyed to create additional nanoporosity by heating. For example, bulky structures may include substantially planar moieties such as a sexiphenylene, but also include three-dimensional moieties such as adamantanes, diamantanes, or fullerenes. Furthermore, it should be appreciated that the polymeric strands according to the inventive subject matter may include adhesion enhancers (e.g., silicon-based groups), chromophores, halogens (e.g., bromine for flame retardation), etc.

Consequently, contemplated polymeric strands may have various configurations. While it is generally contemplated that polymeric strands according to the inventive subject matter are linear strands, alternative configurations may also include branched, superbranched, and three-dimensional configurations. For example, where particularly rigid structures are desired for crosslinked polymeric strands, the strands may include one to many branches, all of which may include reactive groups for crosslinking. On the other hand, where a particularly thick wall strength is desired in the hollow structure, three-dimensional polymeric strands may advantageously be employed.

The molecular weight of contemplated polymeric strands may span a wide range, typically between 400 Dalton and 400000 Dalton, or more, and particularly suitable polymeric strands are described in U.S. Pat. application Ser. No. 09/538276, filed Mar. 30, 2000, and U.S. Pat. application Ser. No. 09/544504, filed Apr. 6, 2000, both of which are incorporated herein by reference. However, it is generally preferred that the molecular weight will be such that flow and gap-filling characteristics are not negatively impacted.

In a particularly contemplated aspect of the inventive subject matter, the polymeric strand may also be formed in situ, i.e., substantially at the same location where crosslinking of the polymeric strands will take place. For example, where the monomers are thermosetting monomers, the polymer can be formed at substantially the same location where crosslinking will occur. Especially contemplated thermosetting monomers are described in U.S. Pat. application Ser. No. 09/618945, filed Jul. 19, 2000, which is incorporated herein by reference. It should further be appreciated that in further alternative aspects, the polymeric strands need not comprise a single type of monomer, but may comprise a mixture of various non-identical monomers.

The hollow structures in contemplated nanoporous polymers may have many shapes and sizes, however, it is generally preferred that the hollow structures have a substantially spherical shape and an inner diameter of less than 100 nm, preferably less than 50 nm, more preferably less than 10 nm, and most preferably less than 3 nm. The term "substantially spherical" as used herein refers to a spheroid. For example, a sphere is a special configuration of a spheroid just as a circle is a special configuration of an ellipse. As seen from another perspective, the term "substantially spherical" is employed to include spheres with a less than perfect spherical geometry (e.g., an egg has a substantially spherical shape). Consequently, the "diameter" of a substantially spherical shape as used herein is the largest distance between the borders of the substantially spherical shape in a planar cross section. For example, commercially available glass microspheres are suspended at a concentration of about 1 mg/ml to approximately 100 mg/ml in a first solvent that also contains a plurality of dissolved olymeric strands (e.g., a 3 wt % solution of polyarylether in cyclohexanone). To this suspension is added a second solvent in which the polymeric strands are not soluble (e.g., ethanol). After sufficient addition of the second solvent, the polymer will precipitate onto the silica particles. Since the surface of the silica particles is considerably larger than the surface of the vessel in which the solvents, the polymeric strands and the particles are disposed, most of the precipitated polymeric strands will deposit on the particles.

Alternatively, the polymeric strands may also be chemically fixed to the microspheres to achieve a particularly firm interaction between the microspheres and the polymeric strands. For example, where the microspheres are glass microspheres, the polymeric strands may be partially, or entirely derivatized with a functional group that is capable of forming a covalent bond with a silanol group present in silica. An especially suitable functional group is —$Si(OEt)_3$. Still further alternative methods of coating the microspheres with a polymeric strands include spraying, electrostatic coating, or dispersion in a liquefied (e.g., liquefied thermoplastic) preparation of polymeric strands, and yet further methods of formation of gas/air filled microcapsules are described in U.S. Pat. No. 5,955,143 to Wheatley et al., which is incorporated by reference herein.

Regardless of the method of deposition, it is contemplated that the polymeric strands are crosslinked in a crosslinking reaction. There are many crosslinking reactions between polymeric strands known in the art, and all of them are considered suitable for use in conjunction with the inventive concepts presented herein. For example, crosslinking may be achieved in a reaction including a radical reaction, a general acid-or base catalyzed reaction, or in a cycloaddition reaction. Furthermore, crosslinking may include exogenous crosslinking agents (e.g, bi- or multifunctional molecules), but also reactions between reactive groups located within the polymeric strands and/or backbones.

Figure 6:
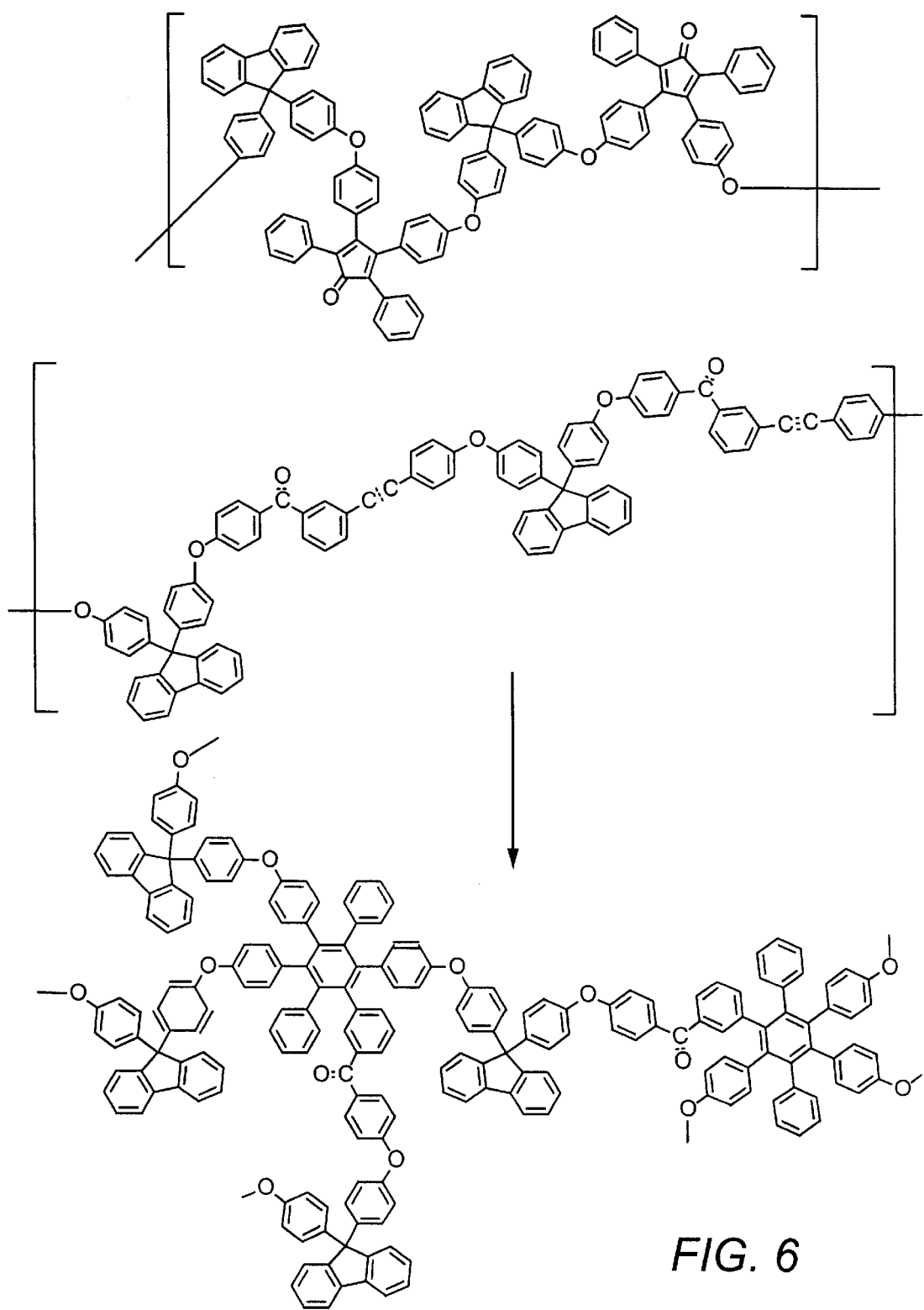
FIG. 6 is an exemplary scheme in which two polymeric strands are coupled/crosslinked via a cyclic structure.

A particularly preferred crosslinking reaction includes a reaction between a diene and a dienophile, both of which are located in the backbone of the polymeric strand, and both of which react to form a cyclic structure as shown in FIG. 6, where one polymeric strand has a cyclopentadienone structure in the backbone, and the other polymeric strand has a triple bond in the backbone. The cyclic structure formed in the crosslinking reaction is consequently a phenyl ring in the newly formed sexiphenylene ring system. Crosslinking reactions of this type are advantageously achieved by thermal activation (ie., heating) of the polymeric strands without addition of exogenously added crosslinking molecules, and further appropriate crosslinking reactions forming cyclic structures are described in U.S. Pat. application Ser. No. 09/544722, filed Apr. 6, 2000, incorporated herein by reference. It is further contemplated that, to prevent aggregation of the particles during the crosslinking process, the particles may be thermally activated in a fluidized bed process employing nitrogen or other inert gases. Alternatively, the particles may be crosslinked by dispersing the particles in a silica based sol gel solution, heating the gel to expel the solvent and water, and subsequent drying at curing (i.e., crosslinking) temperature. Furthermore, the particles may be crosslinked by spraying them through a nozzle into a high temperatures inert gas ambient (200° C.–450° C.); once the particles are sprayed into the high temperature gas (such as nitrogen), they will cross link without becoming aggregated because the individual particles will be surrounded by inert gas molecules.

After crosslinking the polymeric strands on the glass microspheres, it is generally preferred that the glass microspheres are leached out from the crosslinked polymer. Leaching solutions for glass microspheres preferably contain hydrofluoric acid (HF). HF based etching advantageously also removes 'external' silica, where the particles are cured in a silica based sol gel system (supra). Alternatively, many materials for the support structure other than glass microspheres may also be employed, and particularly contemplated materials include materials that dissolve in a solvent that does not dissolve the polymeric strand, or materials that can be evaporated under conditions that do not adversely affect the polymeric strand.

With respect to the size of alternative hollow structures, it is contemplated that macroscopic, microscopic and submicroscopic sizes are appropriate. For example, where the nanoporous material is a bulk material, the size of the hollow structures may be between about 100 μm and 1 mm, and more. On the other hand, the size of the hollow structures may be between about 100 μm and 100 nm where desired, and it is especially contemplated that where the nanoporous material is employed as a dielectric film on an electronic component (e.g., insulator layer in integrated circuits), the size of the hollow structures may be between about 100 nm and 1 nm. While it is generally preferred that the shape of the hollow structure is substantially spherical, many alternative shapes are also appropriate and may include regular shapes such as cylindrical shapes, cubic shapes, etc, but also irregular shapes such as aggregated blisters, or egg shaped forms. The hollow structures according to the inventive subject matter can then be stored or immediately used for admixing with the second polymeric strands.

With respect to the second polymeric strands, it is contemplated that the same consideration apply as for the first polymeric strands, and it is particularly preferred that the first and the second polymeric strands belong to the same chemical class. For example, where the first polymeric strand is a poly(arylene ether) it is preferred that the second polymeric strand is also a poly(arylene ether). However, is should be appreciated that, where desired, the first and second polymeric strands belong to different chemical classes, and all chemically reasonable combinations of chemical classes are contemplated, so long as the first and the second polymeric strands can be coupled together. For example, the first polymeric strand for the formation of the hollow structures may be a polyimide (e.g., because of relatively high thermal resistance) derivatized to include a triple bond for coupling, while the second polymeric strand may be a poly(arylene ether) (e.g., because of desirably low k-value) with a diene for coupling. Other chemical classes may include polycarbonates, polyesters, polyesteramides, polylactams, etc.

In a particularly preferred aspect of the inventive subject matter, the second polymeric strand belongs to the same chemical class as the first polymeric strand (e.g., a poly (arylene ether)), and the second polymeric strand is dissolved at a concentration of about 1 wt % to approximately 15 wt % in an appropriate solvent (e.g., cyclohexanone). To this solution is added a preparation of the hollow structures in an amount sufficient to include approximately 30 vol % air in the final nanoporous polymer. The resulting slurry is subsequently spun as a thin film on a silicon wafer by spin coating at about 3000 rpm for approximately 30 seconds, and subjected to thermal activation at about 400° C. for 30 minutes. The thermal activation will result in crosslinking the second polymeric strands with each other and in coupling the first and second polymeric strands by a reaction involving a first reactive group (e.g. a triple bond, supra) in the first polymeric strand and a second reactive group (e.g., a diene bond, supra) in the second polymeric strand. Thus, it should be especially appreciated, that crosslinking of the second polymer occurs at a moment when the void forming structures are already preformed, and structurally stabilized by crosslinking the first polymeric strand in a separate process.

In alternative aspects of the inventive subject matter, the second polymeric strand need not necessarily be dissolved in a solvent, but may also be in a liquefied state (especially where the second polymeric strand is a thermoplastic material). Alternatively, the second polymeric strand may also be produced in situ, i.e., in the presence of the hollow structure.

With respect to the concentration of the second polymeric strand in the solvent, and the amount of hollow structure included in the solvent, it should be appreciated that both the concentration of the second polymeric strands and the amount of hollow structure may vary considerably, and will typically depend on the particular use and desired material properties. For example, where the nanoporous material is formed as a film, relatively low concentrations of the second polymeric strand are contemplated, including concentrations between 0.001 wt % and 5 wt %. Alternatively, where the nanoporous material will be formed as a bulk material, concentrations of about 5 wt % to 50 wt %, and more are contemplated. Similarly, the amount of hollow structures may vary, depending on the particular desired porosity in the nanoporous material. For example, where relatively high porosity is desired, amounts of the hollow structures may be between approximately 15 wt % and 45 wt % and more, while in other applications where only limited porosity is desired, the amounts of the hollow structures may be between approximately 15 wt % and 0.1 wt % and less.

With respect to the coupling of the first and second polymeric strands, it is contemplated that the coupling may involve exogenously added coupling molecules, or may be performed via a reaction of reactive groups located in the first and second polymeric strands, respectively. It is particularly contemplated, however, that the coupling reaction is performed between a first reactive group in the backbone of the first polymeric strand and a second reactive group in the backbone of the second polymeric strand. For example, the first and second polymeric strands may be poly(arylene ethers) that have both a diene (e.g., a cyclopentadienone) and a dienophile (e.g., a triple bond) in the backbone (similar to FIG. 6), and while one portion of the diene and dienophile in the first and second polymeric strands is utilized to crosslink the first and second polymeric strands, respectively, another portion of the reactive groups is employed to couple the first and second polymeric strands together.

Therefore, nanoporous polymers according to the inventive subject matter may be fabricated by a method having one step in which at least one hollow structure fabricated from a plurality of crosslinked first polymeric strands is provided. In another step, a plurality of second polymeric strands is provided, and in a further step, the hollow structures and the second polymeric strands are combined. In a still further step, at least one of the second polymeric strands is crosslinked with another second polymeric strand, and in yet another step, at least one of the first polymeric strands is coupled with at least one of the second polymeric strands via a covalent bond.

EXAMPLE

The following is an exemplary procedure to fabricate a nanoporous polymer according to the inventive subject matter.

Preparation of First and Second Polymeric Strands

A general synthetic procedure for the nucleophilic aromatic substitution is exemplified in the reaction scheme shown in FIG. 2, and can be performed as a reaction between fluorene bisphenol and 4-fluoro-3'-(4-fluorobenzoyl)tolane: 1L 3-neck RB flask, equipped with an magnetic stirrer, a thermocouple, a Dean-Stark trap, a reflux condenser and $N_2$ inlet-outlet connection is purged by $N_2$ for several hours and fed with 0.2L warm sulfolane. At 70–80° C., 35.042 g (0.1000 Mol) of fluorene bisphenol (FBP), 31.8320 g (0.1000 Mol) of 4-fluoro-3'-(4-fluorobenzoyl)-tolane (FBZT) and 27.64 g (0.2 Mol) of potassium carbonate are added and rinsed by 165 mL of warm sulfolane and 165 mL of toluene. The reaction mass is heated to 140° C. and azeotroped at this temperature for 1–2 hours, then the temperature is gradually raised to 175° C. by removing toluene and the reaction is continued at 175° C. with azeotroping during 15–20 h. The temperature is reduced to 165° C., 4-fluorobenzophenone is added and end-capping is continued for 5 hours. The reaction mass is diluted with 165 mL of NMP and left overnight. Then the cold reaction mass is filtered through paper filter, precipitated in 5×MeOH (0.03% $HNO_3$), re-dissolved in NMP and re-precipitated in 5×MeOH (0.01% $HNO_3$). The precipitate is filtered using paper filter, washed on the filter paper 3 times each with 1L of MeOH and dried in a vacuum oven for overnight at 60°–70° C.

Figure 4A:
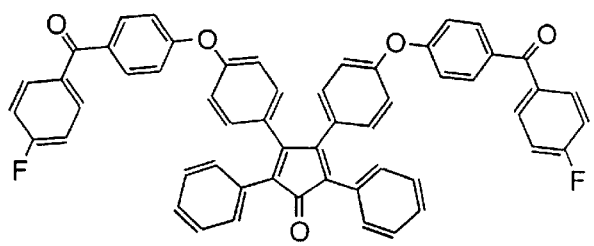
FIGS. 4A–4B are exemplary structures of monomers for a first polymeric strand including a diene.
Figure 4B:
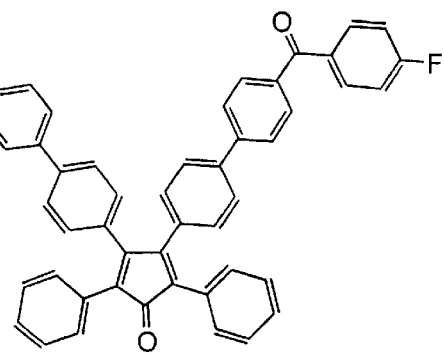
Figure 5A:
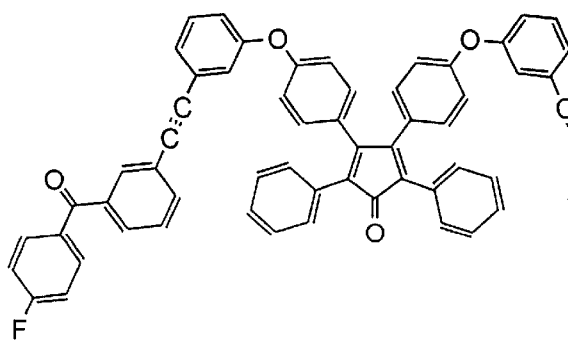
FIGS. 5A–5B are exemplary structures of first polymeric strands including both a triple bond and a diene.
Figure 5B:
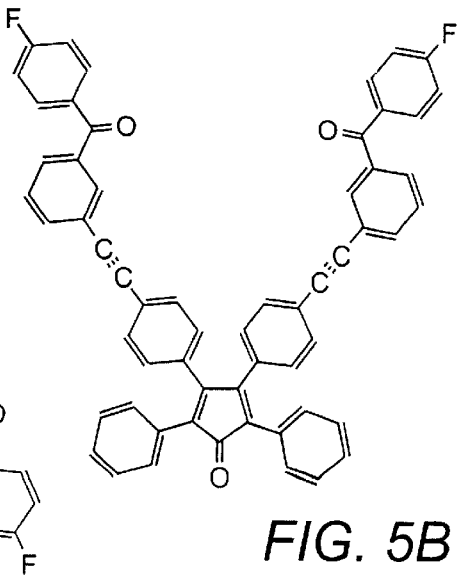

For the formation of first and second polymeric strands including both a diene and a dienophile, a portion (e.g., 50 mol%) of the 4-fluoro-3'-(4-fluorobenzoyl)-tolane (i.e., the dienophile bearing monomer) is replaced with a difluoro-component as depicted in FIGS. 4A and 4B (i.e., a diene bearing monomer). Alternatively, all of the 4-fluoro-3'-(4- fluorobenzoyl)-tolane can be replaced with a difluoro-component as depicted in FIGS. 5A and 5B to impart both the diene and dienophile component in a single monomer.

Formation of Hollow Structures 10 g of commercially available silica particles (Catalyst and Chemicals Industries of Japan) with a diameter of 10 nm are dispersed in 200 ml of a 10 wt % cyclohexanone solution of a poly(arylene ether) having both a tolane moiety and a cyclopentadieneone moiety in the backbone. 200 ml ethanol are gradually added at room temperature under continuous stirring. When precipitation of the poly(arylene ether) is completed, the solvent mixture is removed, and the particles are washed twice with 50 ml methanol.

The polymer coated silica particles will then be heated to at least 400° C. in nitrogen or other inert gas to cure the polymeric strands (i.e., crosslink the polymeric strands) by reacting at least some of the diene groups with at least some of the dienophile groups in the backbones of the polymeric strands, thereby advancing Tg and the mechanical stability of the cured polymeric strands. Alternatively, the curing can be performed in a fluidized bed reactor. There are many fluidized bed reactors known in the art, and all of them are considered suitable in conjunction with the teachings presented herein. In a further alternative procedure, the polymeric strand coated silica particles are dispersed in a silica based sol gel solution. After addition of the particles, water and catalyst (acid or base) is added to initiate gelling. Subsequently, the solvent is removed by heating, and the dried gel is further heated to approximately 400° C. to cure the polymeric strands.

After curing the polymeric strands, the silica particles within the polymer coat are removed by leaching the particles at room temperature with a 5 vol % aqueous solution of hydrofluoric acid for approximately 60 minutes. The resulting hollow polymeric spheres are then washed twice with water and dried in a vacuum oven at 300° C. This leaching step yields hollow spherical particles formed from the crosslinked polymeric strands.

Combination of the Hollow Structures with the Second Polymeric Strands

To 100 ml of a 10 wt % cyclohexanone solution of a poly(arylene ether) having both a tolane moiety and a cyclopentadieneone moiety in the backbone, 8 g of the hollow polymeric spheres are added at room temperature, and the resulting slurry is mixed until homogeneous.

Crosslinking of the Second Polymeric Strands, and Coupling of the First Polymeric Strands to the Second Polymeric Strands 5 ml of the homogeneous slurry are spin coated onto a 200 mm diameter silicon wafer at 3000 rpm for 30 seconds. The coated wafer is then heated on successive hot plates (100, 150, 250° C. to evaporate the solvent, and subjected to a thermal activation at 400° C. to crosslink the second polymeric strands in a reaction identical to the curing reaction of the polymeric strands that form the hollow structures. Likewise, at least some of the remaining diene and dienophile groups from the first and second polymeric strands (i.e., the polymeric strands that form the hollow structures, and the polymeric strands that are admixed to the hollow structures) will react during the thermal activation in a crosslinking reaction identical to the curing reaction of the polymeric strands that form the hollow structures.

The so prepared nanoporous materials are contemplated to exhibit a glass transition temperature Tg of no less than 400° C., since both the first and second uncured polymeric strands individually have a Tg of greater than 400° C., and the curing step generally advances the Tg. With respect to the dielectric constant k, it is contemplated that the k-value is predominantly determined by the k-value of the solid material of the first and second polymeric strands (i.e., the k-value of the polymeric strands without inclusion of hollow structures), and the amount of air included into the nanoporous polymer, and formula (I) can be used to determine the k-value of a nanoporous polymer:

$$\epsilon_0 = (\epsilon_1 * \epsilon_2)/(\epsilon_1 V_2 + \epsilon_2 V_1) \tag{I}$$

wherein $\epsilon_0$ is the dielectric constant of the nanoporous polymer, $\epsilon_1$ is the dielectric constant of the solid first and second polymeric strands, $\epsilon_2$ is the dielectric constant of air, $V_1$ is the volume of the dielectric with the constant $\epsilon_1$ (in a fraction of 1, i.e., a porosity of 30% equals V=0.3), and $V_2$ is the volume of the dielectric with the constant $\epsilon_2$ (also in a fraction of 1). Nanoporous polymers produced according to the inventive subject mater are contemplated to have a dielectric constant k of no more than 2.5, and more preferably of no more than 2.1. For example, where a poly(arylene ether) as described above with a dielectric constant of approximately 2.9 is employed in a nanoporous polymer according to the inventive subject matter, and where the nanoporous polymer has an air content of 30% (with the dielectric constant of air being 1.0), the resulting dielectric constant for the nanoporous polymer is 1.85. Consequently, where the porosity is greater than 30%, it is contemplated that k-values of no more than 2.1, and less can be achieved.

Thus, specific embodiments and applications of nanoporous polymers with hollow structures have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A nanoporous polymer, comprising:
   a plurality of first polymeric strands crosslinked with each other and forming a hollow structure; and
   a plurality of second polymeric strands crosslinked with each other and coupled to at least one of the first polymeric strands via a covalent bond.

2. The nanoporous polymer of claim 1 wherein the plurality of first polymeric strands comprises an aromatic portion.

3. The nanoporous polymer of claim 1 wherein the plurality of first polymeric strands comprises a poly(arylene ether).

4. The nanoporous polymer of claim 3 wherein the poly(arylene ether) comprises a dienophile.

5. The nanoporous polymer of claim 3 wherein the poly(arylene ether) comprises a diene.

6. The nanoporous polymer of claim 1 wherein at least one of the first polymeric strands is crosslinked with at least another one of the first polymeric strands via a cyclic structure.

7. The nanoporous polymer of claim 1 wherein the hollow structure has a substantially spherical shape.

8. The nanoporous polymer of claim 7 wherein the hollow structure has an inner diameter of no more than 10 nanometer.

9. The nanoporous polymer of claim 7 wherein the hollow structure has an inner diameter of no more than 3 nanometer.

10. The nanoporous polymer of claim 1 wherein the plurality of first and second polymeric strands comprises a poly(arylene ether).

11. The nanoporous polymer of claim 1 wherein at least one of the first polymeric strands is coupled to at least one of the second polymeric strands via a cyclic structure.

12. The nanoporous polymer of claim 11 wherein at least one of the first polymeric strands has a triple bond and at least one of the second polymeric strands has a diene, and wherein the at least one first polymeric strand is coupled to the at least one second polymeric strand by reacting the triple bond with the diene.

13. The nanoporous polymer of claim 1 wherein the nanoporous polymer has a dielectric constant k, wherein k is no more than 2.5.

14. The nanoporous polymer of claim 1 wherein the nanoporous polymer has a dielectric constant k, wherein k is no more than 2.1.

15. The nanoporous polymer of claim 1 wherein the nanoporous polymer has a glass transition temperature Tg, wherein Tg is no less than 400° C.

16. A method of forming a nanoporous polymer, comprising:
providing at least one hollow structure fabricated from a plurality of crosslinked first polymeric strands;
providing a plurality of second polymeric strands;
combining the at least one hollow structure and the plurality of second polymeric strands;
crosslinking at least one of the second polymeric strands with another one of the second polymeric strands; and
coupling at least one of the first polymeric strands with at least one of the second polymeric strands via a covalent bond.

17. The method of claim 16 wherein the hollow structure has a substantially spherical shape and a diameter of no more than 10 nanometer.

18. The method of claim 16 wherein the plurality of first polymeric strands and the plurality of second polymeric strands comprises a poly(arylene ether).

19. The method of claim 16 wherein the at least one of the first polymeric strands and the at least one of the second polymeric strands is coupled via a cyclic structure.

20. The method of claim 16 wherein the nanoporous polymer has a dielectric constant k that is no more than 2.5, and wherein the nanoporous polymer has a glass transition temperature Tg that is no less than 400° C.

* * * * *